US011901604B2

(12) United States Patent
Ragan

(10) Patent No.: US 11,901,604 B2
(45) Date of Patent: Feb. 13, 2024

(54) ANTENNA FOR FACILITATING REMOTE READING OF UTILITY METERS

(71) Applicant: Lawrence Ragan, Austin, TX (US)

(72) Inventor: Lawrence Ragan, Austin, TX (US)

( * ) Notice: Subject to any disclaimer, the term of this patent is extended or adjusted under 35 U.S.C. 154(b) by 50 days.

(21) Appl. No.: 17/587,090

(22) Filed: Jan. 28, 2022

(65) Prior Publication Data

US 2022/0285821 A1 Sep. 8, 2022

Related U.S. Application Data

(60) Provisional application No. 63/158,077, filed on Mar. 8, 2021.

(51) Int. Cl.
*H01Q 1/04* (2006.01)
*H01Q 1/38* (2006.01)
*H01Q 1/48* (2006.01)

(52) U.S. Cl.
CPC ................ *H01Q 1/04* (2013.01); *H01Q 1/38* (2013.01); *H01Q 1/48* (2013.01)

(58) Field of Classification Search
CPC .................................................... G01D 4/0002
USPC .......................................................... 343/719
See application file for complete search history.

(56) References Cited

U.S. PATENT DOCUMENTS 5,229,782 A * 7/1993 Hemmie ................ H01Q 19/19 343/822
5,654,717 A * 8/1997 Nichols .................... H01Q 9/32 342/357.31
7,450,071 B1 * 11/2008 Volman ................ H01Q 9/0457 343/846
8,063,848 B2 * 11/2011 Perkins, III .............. H01Q 9/32 343/702
2014/0008446 A1 * 1/2014 Carr ......................... H01Q 7/00 235/492
2018/0138599 A1 * 5/2018 Shehan .................... H01Q 9/32
2021/0119339 A1 * 4/2021 Smith, Jr. .............. H01Q 9/285
2022/0238996 A1 * 7/2022 Kaplan .................... H01Q 1/48

FOREIGN PATENT DOCUMENTS

GB 2484401 A * 4/2012 ........... H01Q 1/2233
WO WO-9708776 A1 * 3/1997 ............. H01Q 1/246
WO WO-2014193257 A1 * 12/2014 ............. H01Q 13/00
WO WO-2020219967 A1 * 10/2020 ........... H01Q 1/2291

* cited by examiner

*Primary Examiner* — Dimary S Lopez Cruz
*Assistant Examiner* — Brandon Sean Woods
(74) *Attorney, Agent, or Firm* — Antony P. Ng; Russell Ng PLLC

(57) ABSTRACT

An antenna for facilitating remote reading of utility meters is disclosed. The antenna includes a metal rod and a printed circuit board (PCB), both enclosed by an envelope that includes a plastic body and a plastic cap. The plastic body includes a channel for receiving the metal rod. The plastic cap is for covering the plastic body. The PCB includes a dielectric layer located between a first and second metal layers. Secured to the PCB, the metal rod is electrically connected to the second metal layer of the PCB, but not the first metal layer of the PCB.

10 Claims, 4 Drawing Sheets

ANTENNA FOR FACILITATING REMOTE READING OF UTILITY METERS

PRIORITY CLAIM

The present application claims priority under 35 U.S.C. § 119(e)(1) to provisional application No. 63/158,077 filed on Mar. 8, 2021, the contents of which are incorporated herein by reference.

TECHNICAL FIELD

The present invention relates to antennae in general, and in particular to an antenna that facilitates remote reading of utility meters.

BACKGROUND

Reading utility metering devices remotely has been proven to be efficient and economical. Automatic meter reading (AMR) is the technology of automatically collecting and transferring data from utility metering devices to a central database for billing, trouble-shooting and analyzing. The AMR technology saves utility providers the expense of periodic trips to each physical location to read utility metering devices.

AMR technology that employs radio-frequency (RF) systems can take many forms. For example, in a two-way or "wake-up" system, a radio signal is normally sent from a reading location to a meter equipped with AMR capability, instructing the meter's transceiver to power-up and transmit its data. In contrast, in a one-way or continuous broadcast type system, a meter equipped with AMR capability transmits data at predetermined intervals. There are also hybrid systems that combine one-way and two-way techniques, using one-way communication for reading and two-way communication for programming functions.

RF-based meter reading systems usually work well for electric and gas meters that are located above ground. However, RF-based meter reading systems tend to be more problematic when they are used to read water meters that are located underground.

Consequently, it would be desirable to provide an improved apparatus that is capable of facilitating remote reading of water meters that are located underground.

SUMMARY

In accordance with one embodiment, an antenna for facilitating remote reading of utility meters includes a metal rod and a printed circuit board (PCB), both enclosed by an envelope that includes a plastic body and a plastic cap. The plastic body includes a channel for receiving the metal rod. The plastic cap is for covering the plastic body. The PCB includes a dielectric layer located between a first and second metal layers. Secured to the PCB, the metal rod is electrically connected to the second metal layer of the PCB, but not the first metal layer of the PCB. The PCB includes a connector having a signal pin and a ground shield. The signal pin is connected to the second metal layer of the PCB, and the ground shield is connected to the first metal layer of the PCB. The second metal layer located between the connector and the metal rod forms an impedance-matching network to provide matching impedance between the connector and the rod.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
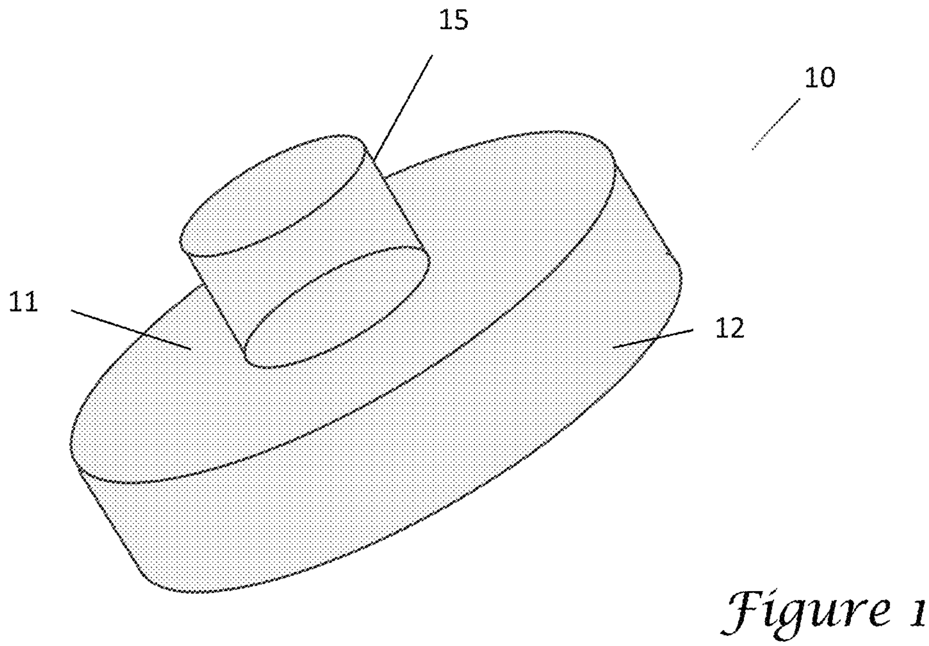
FIGS. 1-2 are an isometric and cross-sectional views, respectively, of an antenna that facilitates remote reading of utility meters, according to one embodiment.

To design an antenna that can provide a usable range from a meter pit located underground at modest power due to limited battery life is not a trivial task. This is because coaxial cables for low-loss transmission of radio frequency energy exhibit a characteristic impedance in the range from 30Ω to 90Ω, with 50Ω and 72Ω being most common. Outside this range, the ratio of inner conductor to shield diameters become difficult or untenable. Vertical polarization of antennae for this service is preferred, due to the need for omni-directional operation, meaning uniform radiation in azimuth. Antennae that radiate preferably in azimuth need to be oriented during installation to obtain optimum performance in the data collection system. In an urban environment, where multi-path transmission is common, the optimum orientation is tedious to determine, and can change with the position of reflecting objects like parked motor vehicles.

To use the available transmit power most effectively, an antenna design should concentrate the radiated energy at a low elevation angle. In the present invention, this is accomplished by enclosing a vertical element over an artificial ground plane in a plastic enclosure that engages plastic lids as part of the radiating system. The dielectric constants of plastics are higher than that of space or air, thus slowing the propagation velocity through the plastic. The slower velocity is utilized in the present invention, by shaping and placement of plastics enclosing the metal components and the supporting lid to create a lens effect, thus enhancing the elevation pattern near the horizon.

Delivering power to the resultant antenna structure is somewhat problematic. This is because coaxial cables for low-loss transmission of radio frequency energy exhibit a characteristic impedance in the range from 30Ω to 90Ω, with 50Ω and 72Ω being most preferable. Outside this range, the ratio of inner conductor to shield diameters become difficult or untenable. In order to maximize transmission efficiency, it is necessary to match the impedance presented at the input of an antenna to the characteristic impedance of the cable attached to the antenna.

The impedance presented between a quarter wavelength vertical element and an infinite ground can be written as:

$$Z_{in}=36.5+j21.25\Omega$$

This is close enough to 50Ω to provide useful transmission efficiency. A finite ground plane, and operation in a plastic envelope as opposed to free space or air exhibits a much different impedance, and it is typically 9Ω to 10Ω. Hence, accommodation for the lower impedance must be made with a different wire configuration or a matching network between the base of an antenna and a coaxial cable connected to other electronic devices.

At least one provider senses the presence of an external antenna and switches the radio to use the external antenna if it is present. This function is provided by adding a feature to the matching network from some point on the signal path to ground that exhibits very high impedance at the operating frequency and low resistance of a direct current path to ground. A parallel inductance and capacitance from the signal path to ground is one way to accomplish this. Another is to provide a high impedance transmission line from the signal-path to ground which is one quarter wavelength long. While such circuitry could be attached anywhere along the signal path, it is least detrimental to the antenna performance to attach it at the lowest impedance point, which is the base of the vertical wire, or near the vertical wire end of the nominal 22Ω quarter wave matching transmission line, where the impedance is nominally 10Ω in the example embodiment. Since the distance to the bottom cover may vary from unit to unit, it may be beneficial to provide a network with a multipole response to achieve a wide enough bandwidth to avoid decreasing the effectiveness of the antenna as manufacturing tolerances detune the DC shorting structure by varying amounts. Tapering the shorting quarter wave line, or using more than one line in series to ground can accomplish this bandwidth widening.

Figure 2:
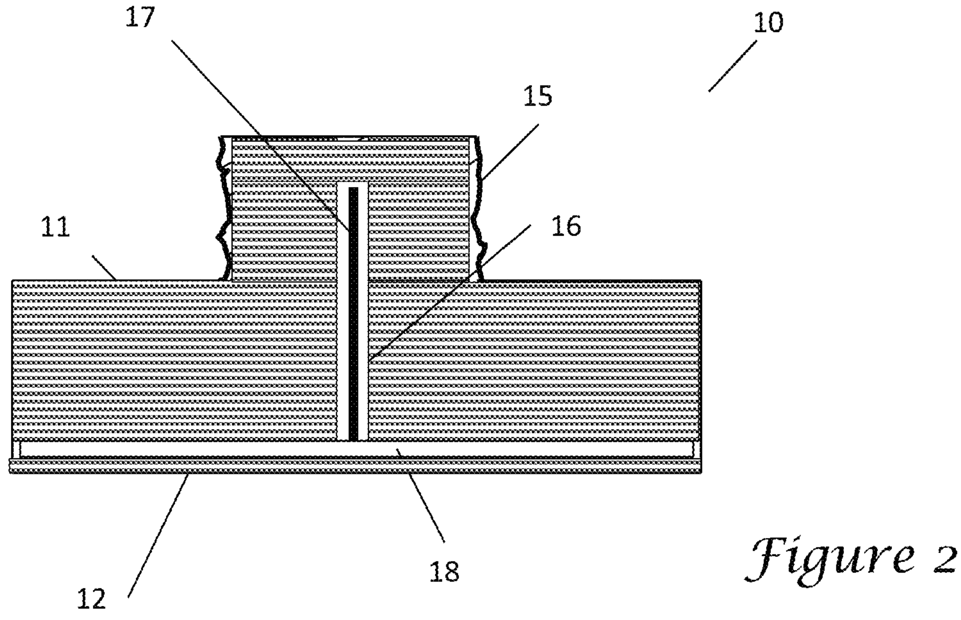

Referring now to the drawings and in particular to FIGS. 1-2, there are illustrated an isometric and cross-sectional views, respectively, of an antenna that facilitates remote reading of utility meters, according to one embodiment. As shown, an antenna 10 includes a transmitting element formed by a single linear rod 17 and a circular plate 18, all enclosed within a plastic envelope that includes a plastic body 11 and a plastic cover 12. Plastic body 11 has a cylindrical shape having a diameter slightly larger than circular plate 18. The diameter of plastic body 11 can be, for example, 12 inches. Plastic base 12 is utilized to cover the open end of plastic body 11. The other end of plastic body 11 is equipped with a screw-like structure 15 having threads to allow antenna 10 to be screwed onto a receiving threaded hole located in a lid for covering a water meter pit (not shown).

Plastic body 11 and screw-like structure 15 are solid structures made of polypropylene to serve as a dielectric lens for antenna 10. In addition, plastic body 11 and screw-like structure 15 include a small hollow channel 16 to accommodate rod 17.

Although plate 18 and plastic body 11 for enclosing plate 18 are shown to have a cylindrical shape, it is understood by those skilled in the art that plate 18 and/or plastic body 11 can be formed of any shapes.

Antenna 10 is designed to operate with plastic cover 12. A similar antenna can be designed to operate with a metal base, but plastic is more preferable because plastic is less expensive to form into appropriate shapes, including the matching threads that receive the subject antenna. Use of an appropriate type of plastic, such as polypropylene, that offers low-dielectric losses to radio waves can serve to further focus the transmitted or received radio waves, thus enhancing the performance by providing preference to low elevation angles. Shaping the dielectric envelope of antenna 10, as well as the geometry of plastic cover 12, can enhance the operational range of antenna 10. Integrating plastic cover 12 as part of the radiating antenna system is the key to the effective implementation of an antenna system.

Figure 3:
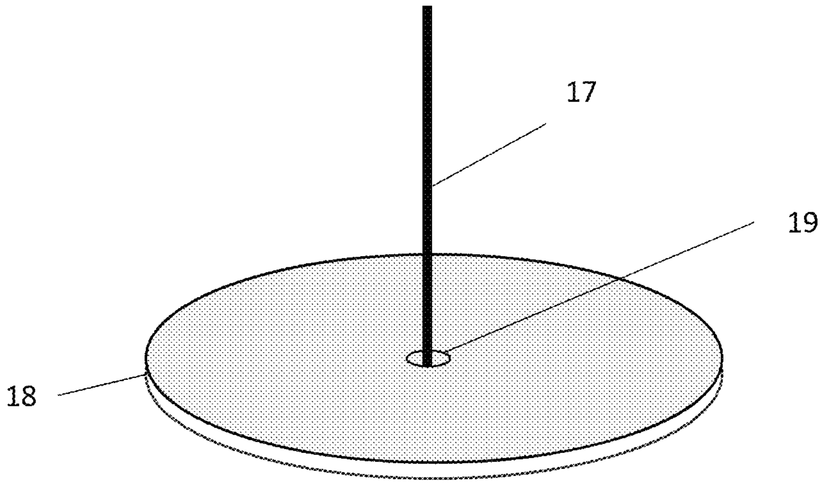
FIGS. 3-5 are an isometric, bottom, and cross-sectional views, respectively, of a transmitting element within the antenna from FIG. 1, according to one embodiment.
Figure 4:
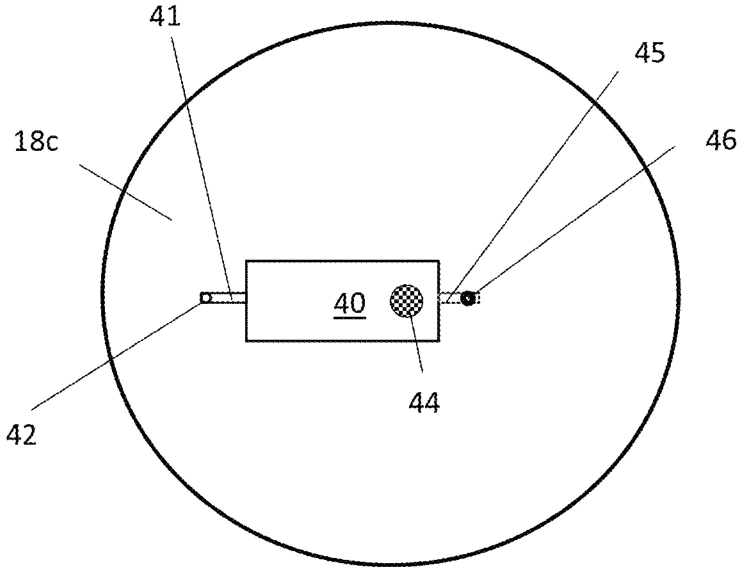
Figure 5:
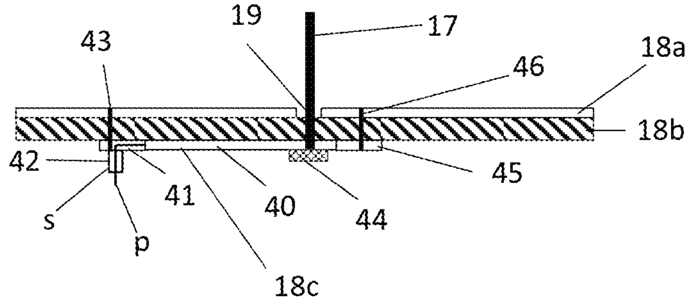

Referring now to FIGS. 3-5, there are illustrated an isometric view, a bottom view, and a cross-sectional view of the transmitting element, respectively, within antenna 10, according to one embodiment. As shown in FIG. 3, rod 17 is secured at a center point of plate 18. Rod 17 can be made of any electrically conductive metal. For the present embodiment, rod 17 is about 2 to 3 inches long with a diameter of 0.05 to 0.1 inches. Plate 18 can be made of, for example, a printed circuit board (PCB). Plate 18 includes a first metal layer **18*a*, a dielectric layer 18*b*, and a second metal layer 18*c*, as shown in FIG. 5. For the present embodiment, first metal layer 18*a* serves as an artificial ground plane for antenna 10**.

At radio frequencies, current in a conductor concentrates near the surface. This phenomenon is known as skin effect. Plate 18 is about 0.062 inch thick. First and second metal layers **18*a*, 18*c* are made of copper with 1 ounce per square foot, which corresponds to approximately 35 micrometers (or microns). At the antenna design frequency of near 1 GHz, copper has a skin depth of approximately 2 microns. Approximately 98% of the current flows within four skin depths of the surface, so effectively all the radio frequency current is carried in the 35 micron thick metal layers 18*a*, 18*c*. Dielectric layer 18*b* is made of non-electrically conductive fiber glass reinforced epoxy-like resin for providing structural integrity to plate 18**.

Rod 17 is physically and electrically connected to second metal layer **18*c* at a solder point 44. However, rod 17 is not physically or electrically connected to first metal layer 18*a* due to a spacing 19 located at the center of first metal layer 18*a***.

The present invention employs a transmission line to implement an impedance-matching network between a coaxial connector 42 and rod 17, and this impedance-matching network has sufficient bandwidth for transmission. The impedance-matching network functions to optimize power transfer between circuits or transmission lines with different impedances. The usage of an impedance-matching network for operation in narrow frequency bandwidth is simpler than those that serve broader bandwidths.

For the present embodiment, the impedance-matching network is formed by second metal layer **18*c* that is shaped in the form of a metal trace 40, as shown in FIG. 4. Metal trace 40 provides impedance matching for the impedance presented between a wire and first metal layer 18*a* (ground plane) and the impedance of a transmission line, such as a coaxial cable, that carries radio frequency energy to and from antenna 10** and a radio transmitter and/or receiver (not shown).

Coaxial connector 42, such as a SSMB coaxial connector, is connected to metal trace 40 via a metal trace 41 that is also formed by second metal layer **18*c*. Coaxial connector 42 includes a signal pin contact P and a ground shield contact S. Signal pin contact P is electrically connected to metal trace 41 that is also connected to metal trace 40**. Ground shield contact S is electrically connected to first metal layer 18*a* via a through-hole connector 43. Coaxial connector 42 is for receiving a coaxial cable that is connected to other electronic devices (not shown) designed to perform automatic meter reading functions. Coaxial connectors are preferred for connector 42, but any connector with two separate contacts could also be used. The impedance of metal trace 41 is the same as the impedance of coaxial connector 42.

Metal trace 40 is approximately ¼ wave long, and serves to match the impedance between rod 17 and first metal layer 18*a* and the 50Ω impedance of coaxial connector 42 along with the 50Ω coaxial cable attaching to coaxial connector 42. For a ¼ wave matching section of transmission line, $Z_0$ (matching section)=square root ($Z_1$*$Z_2$). In this case, $Z_1$=10Ω and $Z_2$=50Ω, so $Z_0$ (matching section)=22Ω. Thus, metal trace 41 has an impedance of 50Ω, as mentioned above, and metal trace 40 has an impedance of 22Ω.

In the descriptions that follow, transmissions line will be referenced by their trace on second metal layer 18*c*. The insulating layer and ground plane are common to all, and are included by reference, so "trace" is to be understood as "transmission line." The propagation velocity of the transmission lines depends on all the dimensions of the structure, including the width of the trace. Different width lines, corresponding to different characteristic impedances that are, for example, ¼ wavelength long will have different trace lengths and widths.

The impedance-matching network can take on many forms that fit on second metal layer 18*c*. More elaborate impedance-matching networks could even use PCB having more than two layers, as long as first metal layer 18*a* layer forming a ground plane for antenna 10 is not disjointed by additional interconnects for such impedance-matching networks. A simple impedance-matching network includes a π-network with reactive elements (such as two capacitors to a ground plane with an intervening inductor), in the form of surface mounted components on second metal layer 18*c*. Alternatively, impedance-matching network can be implemented by discrete components such as a capacitor and/or an inductor. Components could be mounted on first metal layer 18*a*, again provided that interconnects do not impede with the antenna currents carried in first metal layer 18*a*, if such mounting is proven to be more economical.

The length of wire, dimensions of first metal layer 18*a* (i.e., ground plane) and the dimensions and relative dielectric constant of plastic body 11 and plastic cap 12 can be specifically chosen so that the "feed point" impedance between the wire and first metal layer 18*a* is "real," i.e., presents only resistance with low or zero reactance. This choice simplifies design of the quarter-wave matching section of the transmission line formed by metal trace 40 (i.e., second metal layer 18*c*), dielectric layer 18*b* and first metal layer 18*a*, but is by no means necessary.

Plastic cap 12 has reduced effect on the radiation characteristics of antenna 10, as the current of antenna 10 in first metal layer 18*a* (i.e., ground plane) is concentrated in the top layer of copper. Plastic cap 12 can be expanded to cover the radio components, even including the requisite battery. Welding plastic cap 12 in place, and sealing the wire that leads to a water meter, provides a rugged, reliable unit largely impervious to the hostile humidity/temperature environment of a meter pit. A single envelope design accommodates antenna only and antenna/radio products with different bottom cover designs.

The larger cylinder of the envelope serves to preferentially slow the lower portion of the vertically polarized electromagnetic wave as it leaves the wire/plate interface, thus "bending" the radiation downward to create an antenna with a peak response at a lower elevation angle, where the energy is needed to reach distant monitoring antennae.

Figure 6:
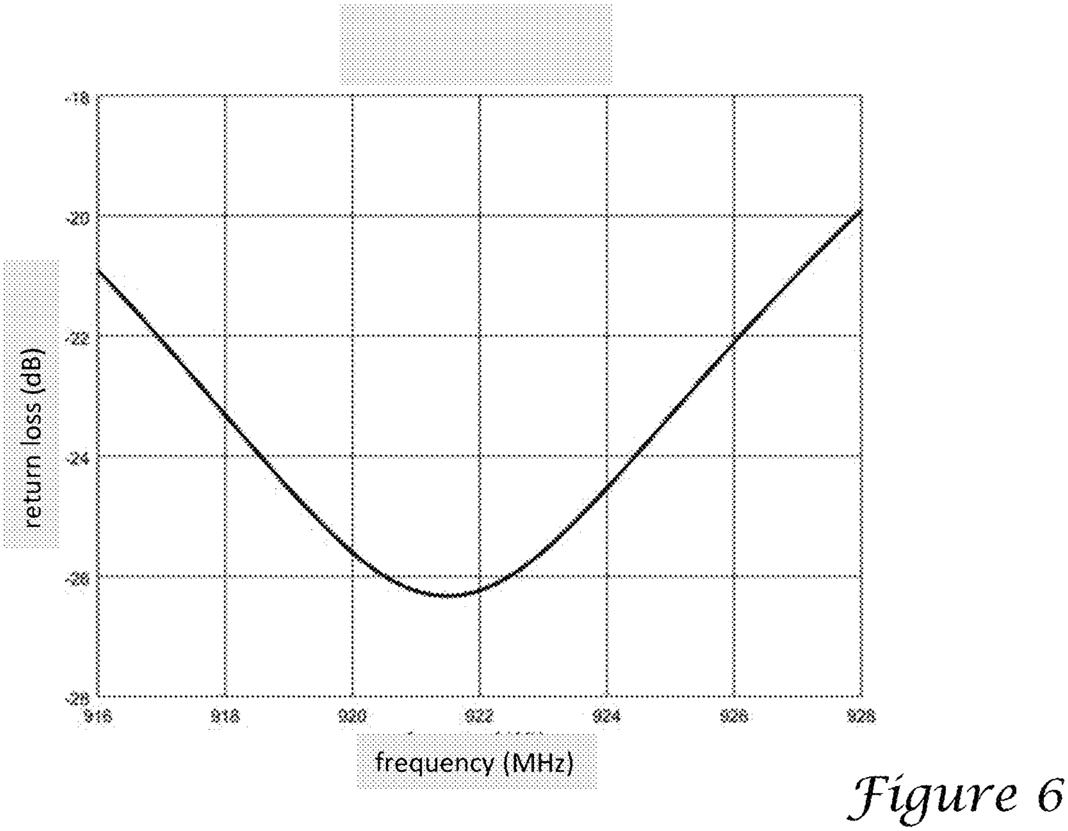
FIG. 6 is a graph showing the simulated return loss for a driving point impedance of 10Ω.
Figure 7:
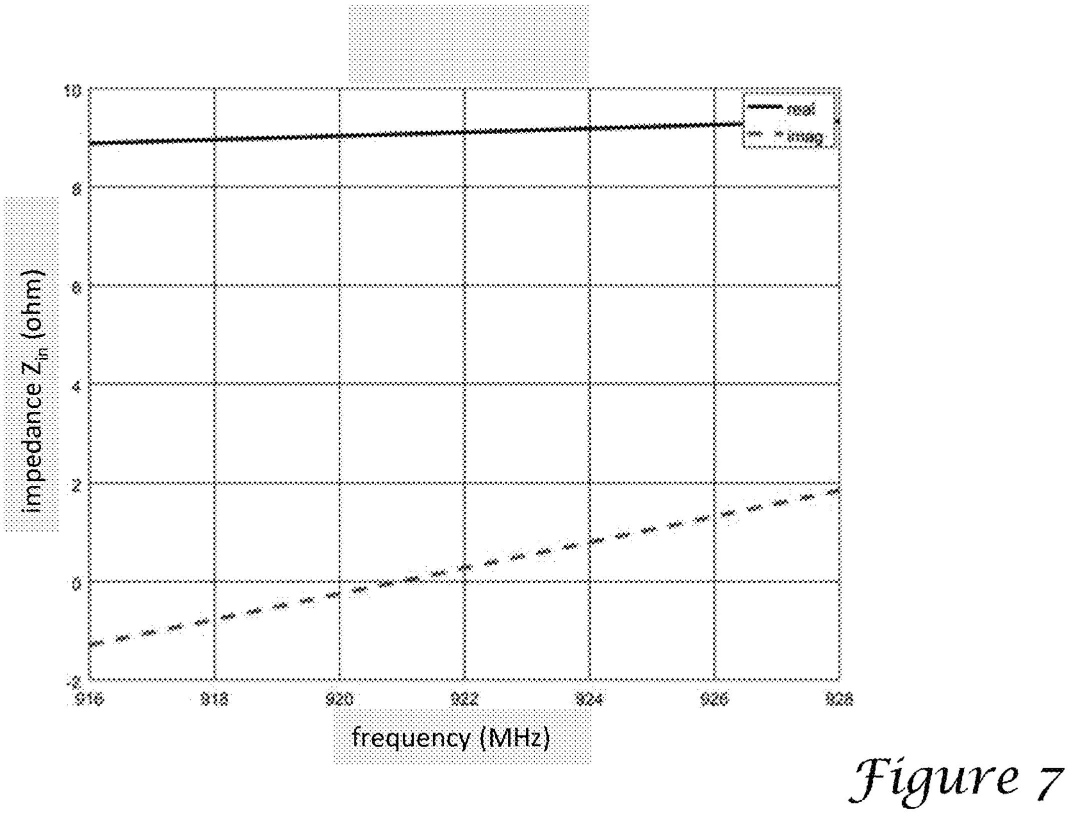
FIG. 7 is a graph showing the nominal simulated impedance of the antenna from FIG. 1.
Figure 8:
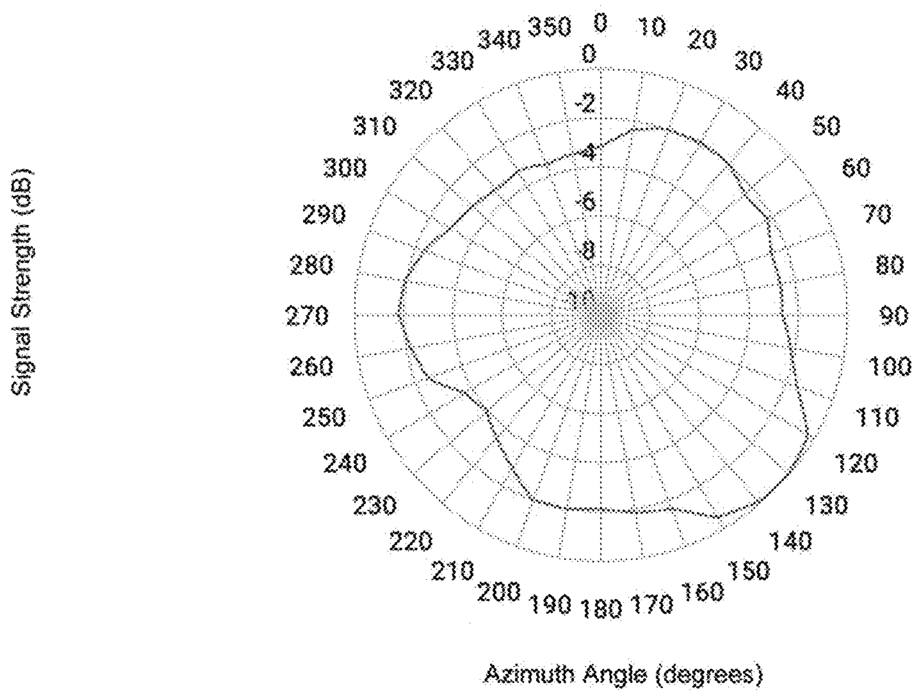
FIG. 8 is a graph showing the resultant measured antenna pattern of the antenna from FIG. 1.

FIG. 6 is a graph showing the simulated return loss of antenna 10, assuming a driving point impedance of 10Ω. FIG. 7 is a graph showing the nominal simulated impedance of antenna 10.

The 10Ω impedance at the base of the wire, at the center of PCB plate 18, is shown in FIG. 4. This placed the 50Ω end of the quarter wave matching section near the edge of the structure, so a 50Ω trace was added to connect to the input connector, shown just to the left of second metal trace 41 center, purely for convenience in installing the antenna in a lid and meter pit. It is simpler, but not necessary, to implement the matching section in a straight line.

One method to provide a low-resistance DC path across the antenna input port is illustrated in FIG. 4 and FIG. 5. A high-impedance transmission line having a metal trace 45 is formed by second metal layer 18*c*, intervening dielectric layer 18*b* and first metal layer 18*a*. Metal trace 45 is preferably very narrow, to effect high characteristic impedance $Z_0$. Metal trace 45 is connected to metal trace 40 via a through-hole connector 46. The length of the high-impedance transmission line is chosen to provide a very high impedance where metal trace 45 connects to metal trace 40, thus providing a low-resistance DC path without adversely affecting the performance of antenna 10 at radio frequencies. This can be done by choosing the length of metal trace 45 so that the high-impedance transmission line is nominally ¼ wavelength long.

Figure 9:
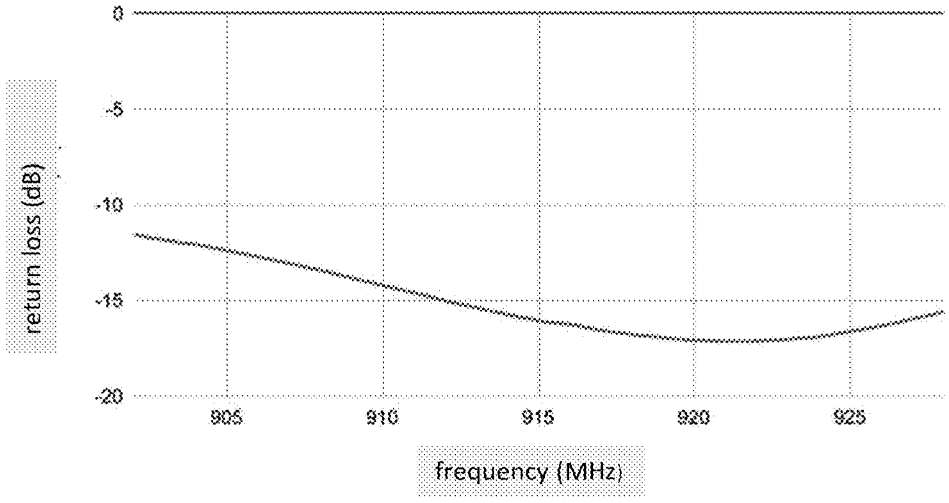
FIG. 9 is a graph showing the measured 50Ω return loss of the antenna from FIG. 1.

Antenna 10 was constructed to the dimensions of the design, using polypropylene for the plastic envelope and cover. The top portion was threaded into a provided plastic lid. This lid was reinforced with two bars of steel, which distort the resultant measured antenna pattern, as shown in FIG. 7. This was measured from a buried pit, on an antenna range on flat terrain, at an elevation angle of seven degrees. Antenna 10 is symmetric in azimuth, so the deviation from a perfect circle in this measurement is attributed to the lid, ground, box walls, etc. The return loss of antenna 10 is shown in FIG. 9. The return loss was measured with antenna 10 mounted in the lid, the lid being suspended above a wooden desk by thin plastic supports. Antenna 10 is quite efficient, so materials with high dielectric losses in the near field can increase the return loss. The measurement did not depend on objects under the bottom of the cover, confirming the fields are above the ground plane, as intended.

The bottom of the PCB can serve as a ground plane, while the top of the PCB holds the impedance-matching network, or any combination of the two functions, so long as the necessary in antenna current is maintained.

As has been described, the present invention provides an improved antenna that facilitates reading of utility meters remotely.

While the invention has been particularly shown and described with reference to a preferred embodiment, it will be understood by those skilled in the art that various changes in form and detail may be made therein without departing from the spirit and scope of the invention.

What is claimed is:

1. An antenna for facilitating remote reading of utility meters, said antenna comprising:

a printed circuit board (PCB) having a dielectric layer located between a metal layer and a metal trace;

a metal rod secured to said PCB, wherein said metal rod is electrically connected to said metal trace but not electrically connected to said metal layer of said PCB;

a connector includes a signal pin contact and a ground shield contact, wherein said signal pin contact is connected to said metal trace of said PCB, and said ground shield contact is connected to said metal layer of said PCB via a through-hole connector;

an impedance-matching network formed by said metal trace located between said connector and said metal rod, wherein said impedance matching network provides matching impedance between said connector and said metal rod, wherein said impedance-matching network is an impedance-matching metal trace formed by said metal trace to provide quarter-wave impedance matching, wherein an impedance of said impedance-matching metal trace is 22Ω, wherein said metal trace includes a first metal trace section located between said connector and said impedance-matching metal trace, wherein an impedance of said first metal trace section is 50Ω;

a second metal trace section connected between said impedance-matching metal trace and said metal layer of said PCB; and an envelope for enclosing said metal rod, said PCB and said connector, wherein said envelope includes a plastic body having a channel to receive said metal rod; and a plastic cap for covering said plastic body.

2. The antenna of claim 1, wherein said envelope includes a screw-like structure for attaching said envelope to a lid.

3. The antenna of claim 2, wherein said screw-like structure includes a plurality of threads.

4. The antenna of claim 2, wherein said plastic body and said screw-like structure are solid structures made of polypropylene to serve as a dielectric lens for said antenna.

5. The antenna of claim 1, wherein said metal layer of said PCB serves as an artificial ground plane.

6. The antenna of claim 1, wherein said antenna further includes a second metal trace section connected between said impedance-matching metal trace and said metal layer of said PCB.

7. The antenna of claim 1, wherein said metal layer and said metal trace are made of copper.

8. The antenna of claim 1, wherein said connector is a coaxial connector.

9. The antenna of claim 1, wherein said metal trace is ¼ wave long.

10. The antenna of claim 3, wherein said screw-like structure is to be screwed onto a receiving threaded hole located in a lid for covering a water meter pit.

* * * * *